(12) United States Patent
Washio

(10) Patent No.: US 7,177,806 B2
(45) Date of Patent: Feb. 13, 2007

(54) SOUND SIGNAL RECOGNITION SYSTEM AND SOUND SIGNAL RECOGNITION METHOD, AND DIALOG CONTROL SYSTEM AND DIALOG CONTROL METHOD USING SOUND SIGNAL RECOGNITION SYSTEM

(75) Inventor: Nobuyuki Washio, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 547 days.

(21) Appl. No.: 10/082,146

(22) Filed: Feb. 26, 2002

(65) Prior Publication Data

US 2003/0101053 A1    May 29, 2003

(30) Foreign Application Priority Data

Nov. 28, 2001    (JP)    ............... 2001-362996

(51) Int. Cl.
 *G10L 21/02* (2006.01)
(52) U.S. Cl. ............. 704/226; 704/235; 704/275
(58) Field of Classification Search ........... 704/217, 704/275, 235, 270.1, 271, 257, 226–227, 704/270; 379/74, 88.16; 455/422.1, 414.1, 455/412.1
See application file for complete search history.

(56) References Cited

U.S. PATENT DOCUMENTS 5,220,595 A * 6/1993 Uehara .................. 379/74
5,638,425 A    6/1997 Meador, III et al. .......... 379/88
6,014,626 A * 1/2000 Cohen ..................... 704/275
6,601,031 B1 * 7/2003 O'Brien .................. 704/270.1
6,708,146 B1 * 3/2004 Sewall et al. .............. 704/217
6,731,724 B2 * 5/2004 Wesemann et al. ...... 379/88.16
6,845,356 B1 * 1/2005 Epstein .................... 704/235

FOREIGN PATENT DOCUMENTS

CA    2045959    4/1996

(Continued)

OTHER PUBLICATIONS

Larsen, L.B. "Investigating a mixed-initiative dialogue management strategy" Automatic Speech Recognition and Understanding, 1997. Proceedings., 1997 IEEE, Workshop on, Dec. 14-17, 1997, pp. 65-71.*

(Continued)

*Primary Examiner*—Richemond Dorvil
*Assistant Examiner*—Huyen X. Vo
(74) *Attorney, Agent, or Firm*—Staas & Halsey LLP

(57) ABSTRACT

A sound signal including either one or both of a voice signal section and a DTMF signal section is inputted to a sound signal matching/recognizing part via a sound signal input part. The sound signal is divided into a sound signal section by a sound signal analyzing part. A matching part conducts a matching process of a sound signal with reference to both a DTMF signal model and a voice signal model. A recognizing part is provided with a language model including a word dictionary and grammar information, and recognizes a sound signal by using the language model based on the matching result of the matching part.

16 Claims, 18 Drawing Sheets

FOREIGN PATENT DOCUMENTS

| | | |
|---|---|---|
| EP | 0 867861 | 9/1998 |
| JP | 58-193595 | 11/1983 |
| JP | 61-60055 | 3/1986 |
| JP | 3-154551 | 7/1991 |
| JP | 4-62600 | 2/1992 |
| JP | 10-171493 | 6/1998 |
| JP | 11-282492 | 10/1999 |
| JP | 2001-223801 | 8/2001 |

OTHER PUBLICATIONS

"Simultanous Use of Dual Tone Multi-Frequency and Voice Recognition in Voice Responce Unit Applications", IBM Technical Disclosure Bulletin, XP 000581612, vol. 39, No. 03, Mar. 1996.

European Search Report mailed Apr. 27, 2006 for corresponding European Patent Application No. 02-00-4432.

Japanese Patent Office Action mailed Feb. 21, 2006 for corresponding Japanese Patent Application No. 2001-362996.

* cited by examiner

| Word ID | Notation | Reading (Speech) |
|---|---|---|
| 1 | 0 | "Zero" |
| 2 | 0 | "Null" |
| 3 | 0 | DTMF—0 |
| 4 | 1 | "One" |
| 5 | 1 | DTMF—1 |
| 6 | 2 | "Two" |
| 7 | 2 | DTMF—2 |
| ... | ... | ... |
| 35 | YES | "Yes" |
| 36 | YES | DTMF—"*" |
| 37 | NO | "No" |
| 38 | NO | DTMF—# |
| ... | ... | ... |

Fig. 3

| Word ID | Notation | Reading (Speech) |
|---|---|---|
| 1 | 0 | "Zero" |
| 1 | 0 | "Null" |
| 1 | 0 | DTMF—0 |
| 2 | 1 | "One" |
| 2 | 1 | DTMF—1 |
| 3 | 2 | "Two" |
| 3 | 2 | DTMF—2 |
| ... | ... | ... |
| 4 | YES | "Yes" |
| 4 | YES | DTMF—"*" |
| 5 | NO | "No" |
| 5 | NO | DTMF—# |
| ... | ... | ... |

Fig. 4

Dialog Example: (U:User input, S:Response from a dialog system)

S1: Thank you very much for joining us.
S2: User ID, please.
U1: "1212" ("1212" is inputted by tough tone)
S3: Your name, please.
U2: Washio
S4: You are Mr. Washio of User ID 1212? Desired product, please.
U3: I would like one piece of Product No. "3821"("3821" is inputted by tough tone).
S5: One car wax of product No. 3821.
U4: "YES"(button "*" is pressed and "YES" is inputted by tough tone)
S6: Your address, please
U5: Kawasaki city Nakahara "4"-"1" ("4" and "1" are inputted by tough tone
S6: Kawasaki city Nakahara 4-1? Your order is accepted
S7: Thank. Please join us again

Fig. 12

| Frequency [Hz] | 1209 | 1336 | 1477 | 1633 |
|---|---|---|---|---|
| 697 | 1 | 2 | 3 | A |
| 770 | 4 | 5 | 6 | B |
| 852 | 7 | 8 | 9 | C |
| 941 | * | 0 | # | D |

(PRIOR ART)

Fig. 17

SOUND SIGNAL RECOGNITION SYSTEM AND SOUND SIGNAL RECOGNITION METHOD, AND DIALOG CONTROL SYSTEM AND DIALOG CONTROL METHOD USING SOUND SIGNAL RECOGNITION SYSTEM

BACKGROUND OF THE INVENTION

1. Field of the Invention

The present invention relates to a sound signal recognition system for executing a recognition process of a sound signal inputted by a user, and a dialog control system using the sound signal recognition system. In particular, the present invention relates to a sound signal recognition system capable of recognizing an input sound signal correctly in any of the case (1) where the input sound signal contains only a voice signal of a user, the case (2) where the input sound signal contains only a Dual tone multi frequency (DTMF) signal that is inputted as a sound signal from a touch-tone telephone system (push phone telephone system), and the case (3) where the input sound signal is a sound signal in which both a voice signal section and a DTMF signal section are mixed. The present invention also relates to a dialog control system for controlling a dialog flow with a user on the basis of a recognition result of the sound signal recognition system.

2. Description of the Related Art

As a human interface with a computer, speech input by a user's voice becomes important. In a conventional speech recognition system, a voice signal of a user is subjected to speech recognition, and recognized data is passed to a computer as input data from the user. For example, this system started being used for an oral operation of an application of a personal computer or for oral input of text data.

Furthermore, sound signal input using a DTMF signal is also widely used. This sound signal input system of the DTMF signal is widely used for a telephone speech guide system or the like. A user uses a touch-tone telephone system and is connected to a computer via a touch-tone telephone line. For example, a user listens to an audio guidance provided from a computer as speech data via a telephone line and selects number buttons of a touch-tone telephone following the audio guidance and press them to input data in the computer. This DTMF signal that is generated by pressing the number buttons of the touch-tone telephone is referred to as a DTMF signal. The conventional DTMF signal recognition system recognizes the sound signal of the DTMF signal and passes recognized data to the computer as input data from the user.

In addition, the DTMF signal is a signal that is generated by pressing a button in the touch-tone telephone system, which is generated as a merged signal of two fundamental frequencies. FIG. 17 is a diagram showing one example of a DTMF frequency table. In this example, 16 data in total including numbers from "0" to "9", alphabets from "A" to "D", and marks "#" and "*" are allocated. For example, with respect to a number "1", two fundamental frequencies 697 Hz and 1209 Hz are allocated, and when the number button "1" of a touch-tone telephone is pressed, a composite sound signal having the fundamental frequency 697 Hz merged with the fundamental frequency 1209 Hz is generated. This composite sound signal becomes a DTMF signal corresponding to the number "1".

In general, when a recognition process of a voice signal is compared with that of a DTMF signal, the latter has a higher recognition rate, a smaller processing load, and so forth; however, a DTMF signal can express only a small number of data. Therefore, in order to input complicated data (for example, the name of a user) that cannot be handled only with DTMF signals, input by a DTMF signal and speech input by a user's voice may be switched depending upon the application.

In the conventional telephone audio response system, when a sound signal input by a DTMF signal is used together with speech input by a user's voice, switching of the two input systems is necessary, it is not possible to execute a recognition process of a sound signal in which both a DTMF signal section of a DTMF signal and a voice signal section are mixed.

FIG. 18 is a simplified diagram showing a conventional exemplary configuration of a telephone audio response system in which input by a DTMF signal is used together with input by a voice signal of a user.

In FIG. 18, 500 denotes a sound signal input part, 510 denotes a switching part, 520 denotes a voice signal recognizing part, and 530 denotes a DTMF signal recognizing part.

The sound signal input part 500 receives a sound signal inputted from outside. For example, the sound signal input part 500 receives a sound signal inputted by a user via a telephone line.

The switching part 520 switches transmission destinations of the sound signal inputted from the sound signal input part 500 so as to pass the sound signal either to the voice signal recognizing part 520 or to the DTMF signal recognizing part 530. The switching is controlled, for example, according to a method of switching the transmission destination to the other in the case where a specific DTMF signal such as a specific DTMF signal showing a command for switching the input mode to the other is detected in the sound signal inputted via the sound signal input part 500.

The voice signal recognizing part 520 executes voice recognition of an input voice signal.

The DTMF signal recognizing part 530 executes recognition of an input DTMF signal.

As described above, according to the conventional configuration, the voice signal recognizing part 520 and the DTMF signal recognizing part 530 are provided independently of each other and execute a recognition process independently. In other words, the recognition process is performed using the DTMF signal recognizing part 530 in an input mode by a DTMF signal and using the voice signal recognizing part 520 in an input mode by a voice.

There is also a conventional configuration in which the voice signal recognizing part 520 and the DTMF signal recognizing part 530 are formed as one unit. In this configuration, the switching part 510 is included inside, and a recognition process is conducted using only either one of the voice signal recognizing part 520 or the DTMF signal recognizing part 530 while switching them. Thus, this configuration is essentially the same as that shown in FIG. 18. According to the aforementioned conventional configuration, as a result of recognizing the sound signal, only one of the recognition results of the voice signal or the recognition results of the DTMF signal can be obtained.

Therefore, the conventional telephone audio response system has the following problems.

First, the user needs to switch input by a voice signal and input by a DTMF signal, so that the load of this switching operation increases. Furthermore, there are also cases where the user is not sure in which mode input is to be done, and the user is confused disadvantageously.

Second, when the telephone audio response system side does input of a sound signal in an input mode other than the expected input mode, the recognition rate drops, and in some cases, it leads to the problem of recognition incapability. For example, in the case where the telephone audio response system is expected to perform sound signal recognition using the DTMF signal recognizing part 530, when the user conducts input by a voice, this voice signal cannot be recognized in the DTMF signal recognizing part 530.

Third, since the conventional system cannot recognize a sound signal in which a sound signal section by a voice and a sound signal section by a DTMF signal are mixed, it lacks convenience for a user. For example, when the data "the registration number is 1234" is to be inputted as a sound signal, it is convenient if a sound signal in which a voice signal section is mixed with a DTMF signal section can be inputted as follows: the beginning part of "the registration number is" is inputted by a voice, and then the part of numbers "1234" is inputted as a DTMF signal indicating "1", "2", "3", and "4", which may be followed by the remaining part inputted by pressing buttons in the touch-tone telephone system. Since the conventional telephone audio response system cannot accept entry of the sound signal in which the voice signal section and the DTMF signal section are mixed as mentioned above, this system lacks convenience for a user.

Fourth, the design of the telephone audio response system is complicated to increase the man-hour, which results in the cost rise. In other words, the conventional telephone audio response system requires guidance for correctly guiding the input mode, so that the algorithm of a dialog flow becomes complicated, which leads to an increase in cost with complication of the design processes.

SUMMARY OF THE INVENTION

Therefore, with the forgoing in mind, it is an object of the present invention to provide a sound signal recognition system and a sound signal recognition method that are capable of recognizing an input sound signal correctly in any of the case where the input sound signal includes only a voice signal of a user, the case where the input sound signal includes only a sound signal by a DTMF signal, and the case where the sound signal is a sound signal in which both a voice signal section and a DTMF signal section are mixed, and that require no switching operation of input mode by a user, and a dialog control system and a dialog control method using the sound signal recognition system.

In order to achieve the above-mentioned object, the sound signal recognition system of the present invention includes: a sound signal input part for receiving a sound signal including either one selected from a voice signal section and a DTMF signal section or both sections; a matching part including a voice signal model and a DTMF signal model, for conducting a matching process of the sound signal inputted from the sound signal input part by using both the voice signal model and the DTMF signal model for reference; and a sound signal recognizing part including a language model, for recognizing the sound signal by using the matching result of the matching part and the language model, wherein a sound signal recognition process is conducted with respect to the sound signal including either one selected from the voice signal section and the DTMF signal section or both sections.

Herein, the sound signal recognizing part selects a better result by comparing the matching result using the voice signal model with the matching result using the DTMF signal model in the matching part for each segment of a sound signal section serving as a recognition unit, the sound signal recognition system further including an integrating part for connecting sound signal recognition results selected by the sound signal recognizing part and integrating them as a total sound signal recognition result with respect to all the sections of the input sound signal.

Because of the above-mentioned configuration, the sound signal recognition system of the present invention can recognize a sound signal correctly in any of the case where the input sound signal contains only a voice signal of a user, the case where the input sound signal contains only a DTMF signal, and the case where the input sound signal is a sound signal in which both a voice signal section and a DTMF signal section are mixed. In addition, a switching operation of an input mode becomes unnecessary, and a scenario for correctly guiding an input mode becomes unnecessary, whereby the number of design processes and cost can be reduced.

Herein, if the word dictionary of the language model includes a DTMF signal as a sound signal recognition vocabulary, matching between the DTMF signal and the word becomes possible, and sound signal recognition of the DTMF signal becomes possible.

The above-mentioned sound signal recognition system of the present invention may include a guidance part. The guidance part can provide a user who performs sound signal input via the sound signal input part with guidance on whether a specific vocabulary is to be input as sound signal input by a voice or sound signal input by a DTMF signal.

Herein, in the case where the integrating part detects that a misidentification rate of a sound signal inputted by a voice for a specific vocabulary is high under predetermined conditions, the integrating part can notify the guidance part of instruction information for displaying guidance for asking the user to conduct re-input of the sound signal by a DTMF signal for the specific vocabulary. Furthermore, in the case where the integrating part estimates and holds a misidentification rate in the matching result for the sound signal by a voice and a misidentification rate in the matching result for the sound signal by a DTMF signal, and either one of the misidentification rates becomes higher than a predetermined value, the integrating part can notify the guidance part of instruction information for displaying guidance to the user to conduct input by the other sound signal. Herein, the predetermined conditions refer to the case where the SN ratio in the speech input environment, the communication environment etc. does not reach a predetermined level, the case where the likelihood of voice input of the user obtained in the course of a dialog is generally low, or the like Furthermore, by providing a program for realizing the above-mentioned sound signal recognition system, the sound signal recognition processing of the present invention can be realized easily at low cost by using a personal computer or the like.

Furthermore, by providing a dialog control part including the sound signal recognition system, for controlling a dialog flow with a user based on recognition results of a sound signal in the sound signal recognition system, a dialog control system adopting a sound signal recognition system can be provided.

BRIEF DESCRIPTION OF THE DRAWINGS

FIG. 1 is a schematic diagram showing the configuration and the processing flow of a sound signal recognition system of Embodiment 1 according to the present invention and.

FIG. 3 shows an example of a word dictionary held by a language model.

FIG. 4 shows an example of another word dictionary held by the language model.

FIG. 12 shows an example of a dialog flow that takes place between a user and the dialog control system of Embodiment 4.

FIG. 17 shows an example of a conventional DTMF frequency table.

DESCRIPTION OF THE PREFERRED EMBODIMENTS

Hereinafter, with reference to the accompanying drawings, sound signal recognition systems and methods of the present invention will be described by way of Embodiments 1 to 3, dialog control systems and methods of the present invention will be described by way of Embodiments 4 to 5, and a program describing a sound signal recognition process and a dialog control process of the present invention will be explained by way of Embodiment 6.

Embodiment 1

A sound signal recognition system and a sound signal recognition method of the present invention are implemented by handling both the recognition process of a DTMF signal and the recognition process of a voice signal uniformly in one sound signal recognition process, whereby a sound signal recognition process can be correctly conducted in any of the case where the input sound signal includes only a sound signal by a DTMF signal, the case where the input sound signal includes only a sound signal by a user's voice, and the case where the input sound signal is a sound signal in which both a DTMF signal section and a voice signal section are mixed.

Figure 1:
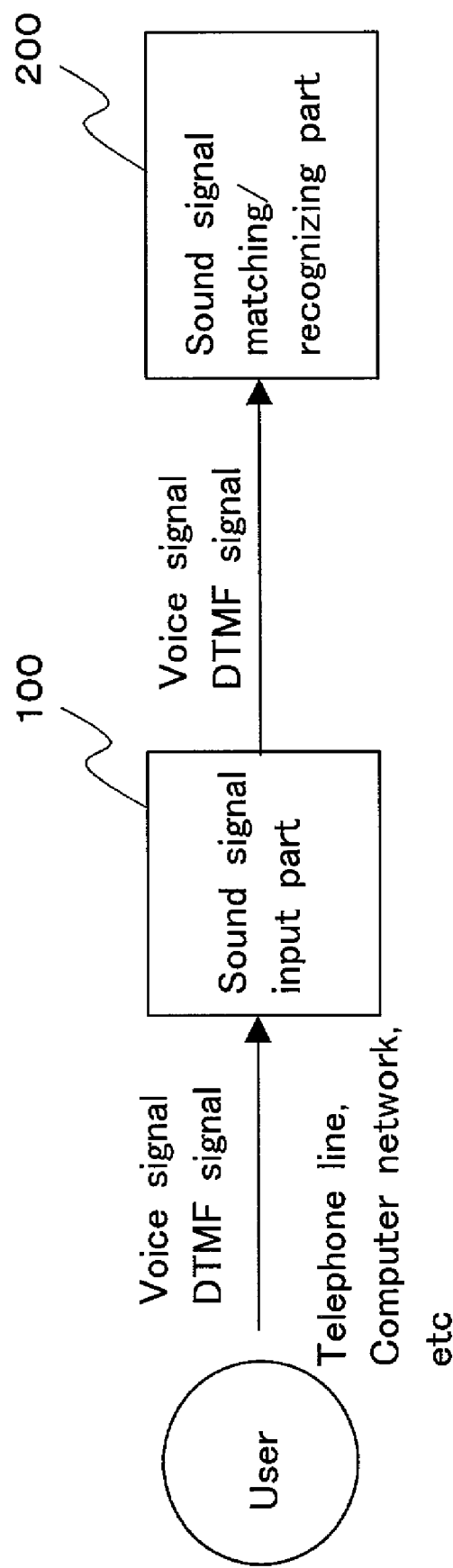

FIG. 1 is a schematic diagram showing the configuration and the processing flow of a sound signal recognition system of Embodiment 1 according to the present invention.

Reference numeral 100 denotes a sound signal input part for inputting a sound signal inputted from outside. The sound signal input part 100 is, for example, connected to a public telephone line, and receives a sound signal transmitted therefrom. Furthermore, when a VoIP (Voice over Internet Protocol) telephone system is used, the sound signal input part 100 is connected to a computer network, and receives a sound signal transmitted on the network.

Herein, a sound signal to be inputted may be either one selected from a user's voice signal or a DTMF signal, or a sound signal in which a DTMF signal section and a voice signal section are mixed.

Reference numeral 200 denotes a sound signal matching/recognizing part. The sound signal matching/recognizing part 200 does not determine that the input sound signal is either one selected from a voice signal and a DTMF signal and handles it uniformly as a signal of sound without distinguishing them to execute a matching process and a recognition process.

Figure 2:
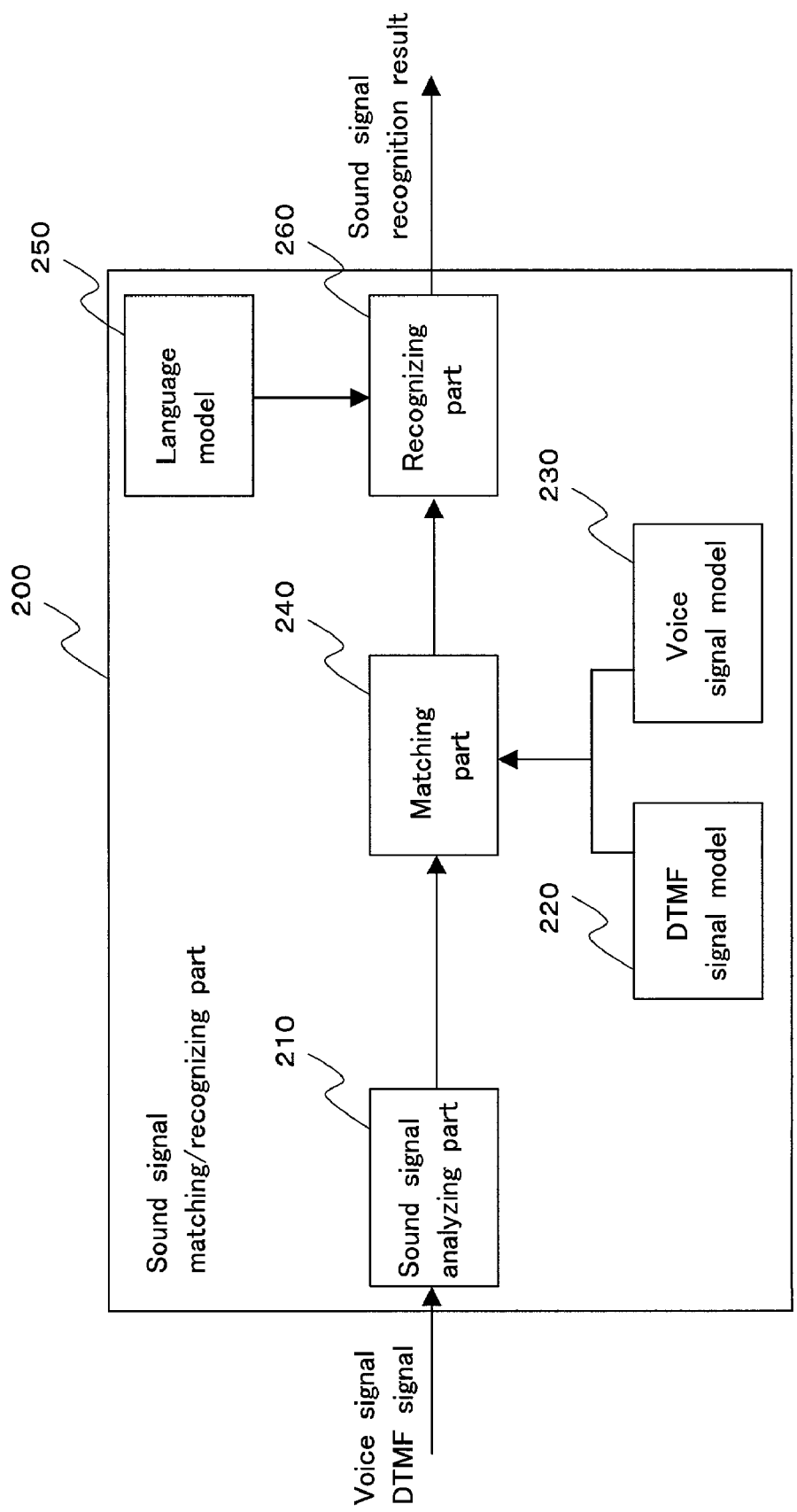
FIG. 2 is a diagram showing the internal configuration of a sound signal matching/recognizing part of Embodiment 1.

The sound signal matching/recognizing part 200 may have several internal configurations. FIG. 2 shows the internal configuration of the sound signal matching/recognizing part 200 of Embodiment 1.

In the configuration of FIG. 2, the sound signal matching/recognizing part 200 includes a sound signal analyzing part 210, a DTMF signal model 220, a voice signal model 230, a matching part 240, a language model 250, and a recognizing part 260.

The sound signal analyzing part 210 divides a sound signal inputted from the sound signal input part 100 into each segment of a sound signal section serving as data of a recognition unit and extracts a feature value of each sound signal that has been divided into each segment. The process of dividing the sound signal section is conducted, for example, as a process of dividing a sound signal into a fixed time length (frame length). The process of extracting the feature value may be conducted using a feature value extraction algorithm adopted for creating a DTMF signal model or a voice signal model (described later). For example, by adopting a feature value extraction process using a fast Fourier transform (FFT) or the like, this process is implemented with respect to the sound signal with a fixed time length (frame length) for each fixed time (frame cycle).

The DTMF signal model 220 is model information including collected feature values of the respective DTMF signals.

The voice signal model 230 is model information showing how a feature value is distributed for each recognition unit (for example, phoneme, syllable, word) using a VQ (Vector Quantization) or a HMM (hidden Markov Model) or the like as in the conventional voice recognition.

The matching part 240 is used for matching the sound signal for each section passed from the sound signal analyzing part 210 by using both the DTMF signal model 220 and the voice signal model 230. In Embodiment 1, both the DTMF signal model 220 and the voice signal model 230 are used for reference by one matching part 240. The matching process is conducted by calculating scores based on the matching of a sound signal in each section with a phoneme, syllable, DTMF sound inside the model and obtaining the matching result. The scores can be determined freely, but for example, in the case of a matching process that uses the DTMF signal model 220, due to its high recognition accuracy, the score is given as a crisp value of "1" or "0". Furthermore, in the case of a matching process that uses the voice signal model 230, the score is given as likelihood of output probability of a certain state in a certain phoneme in the speech recognition according to the HMM using a normal distribution.

The language model 250 is model information including only a word dictionary, and a word dictionary and grammatical rules. Examples of a word dictionary held by the language model 250 are shown in FIGS. 3 and 4. With respect to the word dictionary in the example of FIG. 3, the correspondence of word ID, notation and reading (speech) are described for each word. When the notation can be regarded as the word ID or the correspondence between the word ID and the notation is managed by the matching part 240, the notation column in the word dictionary is unnecessary. With respect to the word dictionary in the example of FIG. 4, the same word ID is given uniformly to the word with the same meaning, and the correspondence of uniformed word ID, notation and reading (speech) are described. An example of the grammatical rules held by the language model 250 is automaton grammar. A typical form of the automaton grammar is BNF (Backus-Naur Form).

The recognizing part 260 obtains a score from the matching part 240 as a criteria for recognizing what kind of voice signal or DTMF signal each sound section is, refers to the word dictionary in the language model 250, executes a search process in the time direction such as DP matching, and searches for only one word with the highest score among all the input sections or a predetermined number of words of a higher order. This recognition result can be expressed using the word ID included in the word dictionary.

Due to the above-mentioned configuration, regardless of whether the input sound signal includes only a sound signal by a DTMF signal, only a sound signal by a voice, or a sound signal in which both a DTMF signal section and a voice signal section are mixed, both the DTMF signal model 220 and the voice signal model 230 are used for reference and matching by one matching part 240, and the recognizing part 260 executes a correct sound signal recognition process using the word dictionary in the language model 250 based on the score obtained from the matching part 240.

Next, a matching process in the matching part 240 using both the DTMF model 220 and the voice signal model 230 will be described in detail, in the case where a sound signal is inputted which includes a voice signal section and a DTMF signal section are mixed.

In the following example, a sound signal recognition process will be described, in which a user first inputs "1" by pressing a button of a touchtone telephone to the sound signal recognition system and then inputs user's name "WASHIO" by a voice, thereby inputting "1, WASHIO" continuously in the dialog.

Figure 5A:
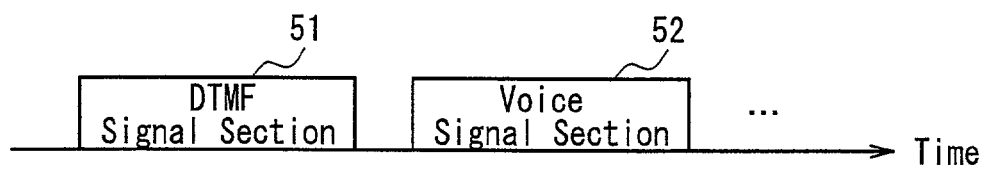
FIG. 5A is a schematic diagram showing a sound signal in which a voice signal section and a DTMF signal section are mixed.
Figure 5B:
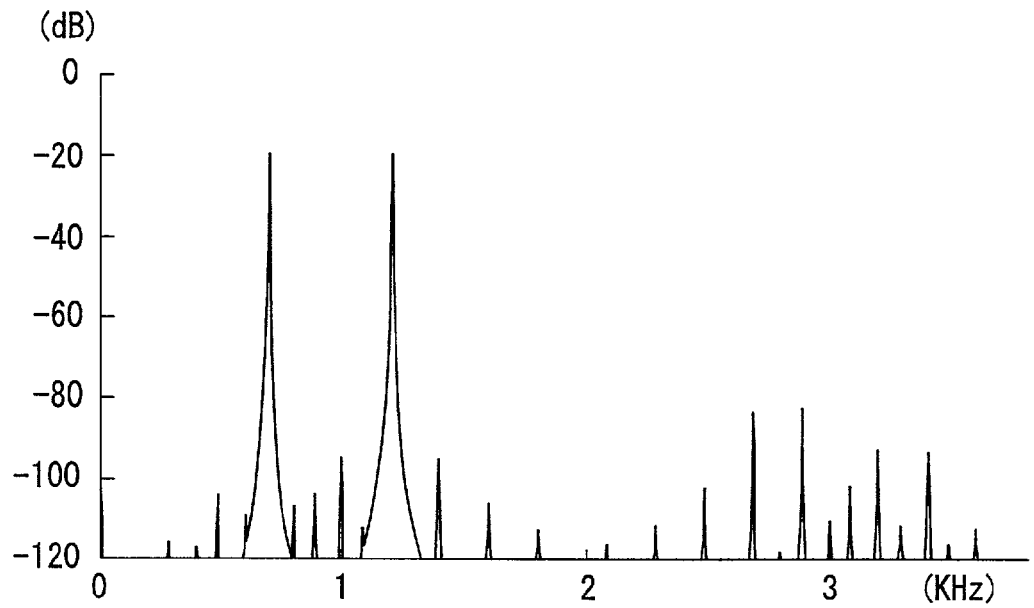
FIG. 5B shows an example of a DTMF signal spectrum.

FIG. 5A is a diagram showing the concept of a sound signal in which a voice signal section and a DTMF signal section are mixed; FIG. 5B shows an example of a DTMF signal spectrum; and FIG. 5C shows an example of a voice signal spectrum.

The sound signal shown in FIG. 5A includes two sound signal sections 51 and 52. Reference numeral 51 denotes a DTMF signal section of a DTMF signal and has a spectrum signal waveform as shown in FIG. 5B. For example, FIG. 5B schematically shows a DTMF signal sound that is generated when a user inputs a user ID number (herein, "1") by pressing a button of a touch-tone telephone. Reference numeral 52 denotes a voice signal section and has a spectrum signal waveform shown in FIG. 5C. Herein, FIG. 5C schematically shows a voice signal obtained when a user inputs a user's own name "WASHIO" by a voice.

The sound signal shown in FIG. 5A is inputted from the sound signal input part 100 and passed to the sound signal matching/recognizing part 200.

Figure 5C:
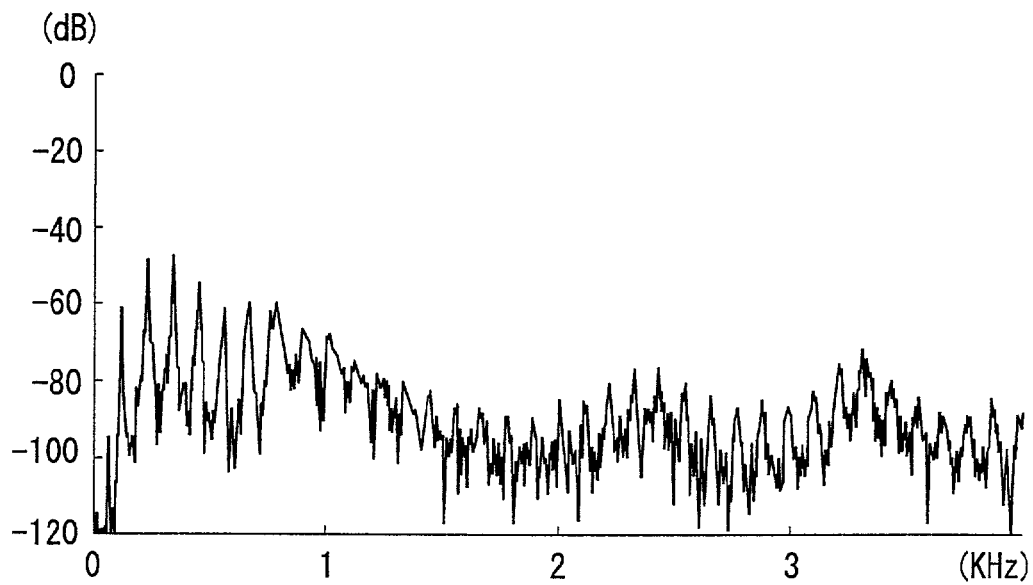
FIG. 5C shows an example of a voice signal spectrum.

Furthermore, in the sound signal analyzing part 210 of the sound signal matching/recognizing part 200, the sound signal is separated into the sound signal section 51 (FIG. 5B) and the sound signal section 52 (FIG. 5C).

(1) Recognition Process with Respect to the Sound Signal Section 51

The matching part 240 starts a matching process with respect to the sound signal section 51.

For executing a matching process, both a matching process with reference to the DTMF signal model 220 and a matching process with reference to the voice signal model 230 are executed concurrently for reference.

(a) Matching Process with Reference to the DTMF Signal Model 220

An example of the matching process with reference to the DTMF signal model 220 is as follows. The flow of the process is summarized in a flow chart shown in FIG. 6.

First, the matching part 240 detects two peak frequencies from the waveform spectrum of an input signal of FIG. 5B. The spectrum signal waveform of the sound signal in the sound signal section 51 has two peaks as shown in FIG. 5B, and these peaks are detected as f1 and f2 (f1 is the higher frequency, and f2 is the lower frequency) (Operation 601).

Next, with respect to the detected two peak frequencies, frequency components that fall within a predetermined threshold range are searched from the respective frequency components of the DTMF frequency table shown in FIG. 17 (Operation 602). If the frequency components that fall within the predetermined threshold range cannot be found in the DTMF frequency table of FIG. 17 (Operation 602: N), the matching part 240 outputs the score "0" as a result of matching process with reference to the DTMF signal model 220 (Operation 607). The example herein has "1" as a DTMF signal in the sound signal section 51, so that 1209 Hz for f1 and 697 Hz for f2 are detected.

Herein, in cases where the noise level of the input sound signal is large or the waveform of the input sound signal is distorted greatly, it is possible to raise the recognition accuracy of the DTMF signal by optionally executing the processes shown below as Operations 603 to 605.

First, the matching part 204 checks whether a level difference between the detected two peak frequencies is a predetermined threshold value or higher (Operation 603). It is assumed that a level value of f1 is L1 and a level value of f2 is L2. When the level difference (L2−L1) is a predetermined level or higher (Operation 603: Y), the matching part 240 outputs the score "0" as a result of matching process with reference to the DTMF signal model 220 (Operation 607). This is because the DTMF signal should include two frequency components with peaks of about the same high level, and even if two peak frequencies are present, when a difference therebetween is larger than the predetermined threshold value, this sound signal can be presumed to be not a DTMF signal.

Second, the matching part 240 searches for the third highest peak (referred to as f3 and its level value as L3) from the sound signal section 51 and checks whether a difference (L1−L3) between the level value L3 of f3 and the level value L1 of f1 is a predetermined threshold value or higher (Operation 604). If the level difference therebetween is not a predetermined threshold value or higher (Operation 604: N), the matching part 240 outputs the score "0" as a result of matching process with reference to the DTMF signal model 220 (Operation 607). This is because the DTMF signal should have two high peaks while other frequency components should not include high peaks, and when the difference (L1−L3) in peak level between f1 and f3 does not reach the predetermined threshold value, this sound signal can be presumed to be not a DTMF signal.

Third, the matching part 240 obtains an average value (this value is referred to as L4) of the level in a frequency portion other than the frequency ranges near f1 and f2, that is, in a frequency portion other than the frequency ranges of f1±α and f2±α, where α is a predetermined threshold value, and checks whether a difference (L1−L4) between this average value L4 and the level value L1, of f1 is a predetermined threshold value or higher (Operation 605). If the difference (L1−L4) is not a predetermined threshold value or higher (Operation 605: N), the matching part 240 outputs the score "0" as a result of matching process with reference to the DTMF signal model 220 (Operation 607). This is because the DTMF signal should have two high peaks while all the other frequency components should be sufficiently smaller than these two peaks, and when the difference (L1−L4) between the average value L4 and the level L1 of f1 does not reach the predetermined threshold value, this sound signal can be presumed to be not a DTMF signal.

As described above, the matching part 240 recognizes the sound signal in the sound signal section 51 from the two detected peak frequencies on the basis of the DTMF frequency table of Table 10 (Operation 606). Herein, the sound signal section 51 is recognized as "1", and its score value is increased to "1".

(b) Matching Process with Reference to the Voice Signal Model 230

On the other hand, an example of a matching process with respect to the sound signal section 51 with reference to the voice signal model 230 is as follows.

With respect to the DTMF signal with the frequency spectrum as in FIG. 5B, when a matching process with reference to the voice signal model 230 is executed, a candidate of voice that can be matched is not found in the voice signal model 230. This is because a human voice signal includes a complicated spectrum across a wide frequency range as shown in FIG. 5C and is different from the frequency spectrum of a machine sound with two peak frequencies as the DTMF signal of FIG. 5B. Therefore, when the DTMF signal is matched by the voice signal model, its score is taken as an extremely low value of around "0".

The matching part 240 selects the result of matching process with the best score value "1" from the above-mentioned two processes, and the sound signal section 51 can be recognized as showing "1" by the DTMF signal. Herein, it is dear that the matching part 240 was able to recognize the sound signal correctly without distinguishing whether the sound signal section 51 is a DTMF signal or a voice signal.

(2) Recognition Process with Respect to the Sound Signal Section 52

Next, the matching part 240 starts a matching process with respect to the sound signal section 52.

Also for executing a matching process with respect to the sound signal section 52, both a matching process with reference to the DTMF signal model 220 and a matching process with reference to the voice signal model 230 are executed concurrently for reference.

(a) Matching Process with Reference to the DTMF Signal Model 220

Figure 6:
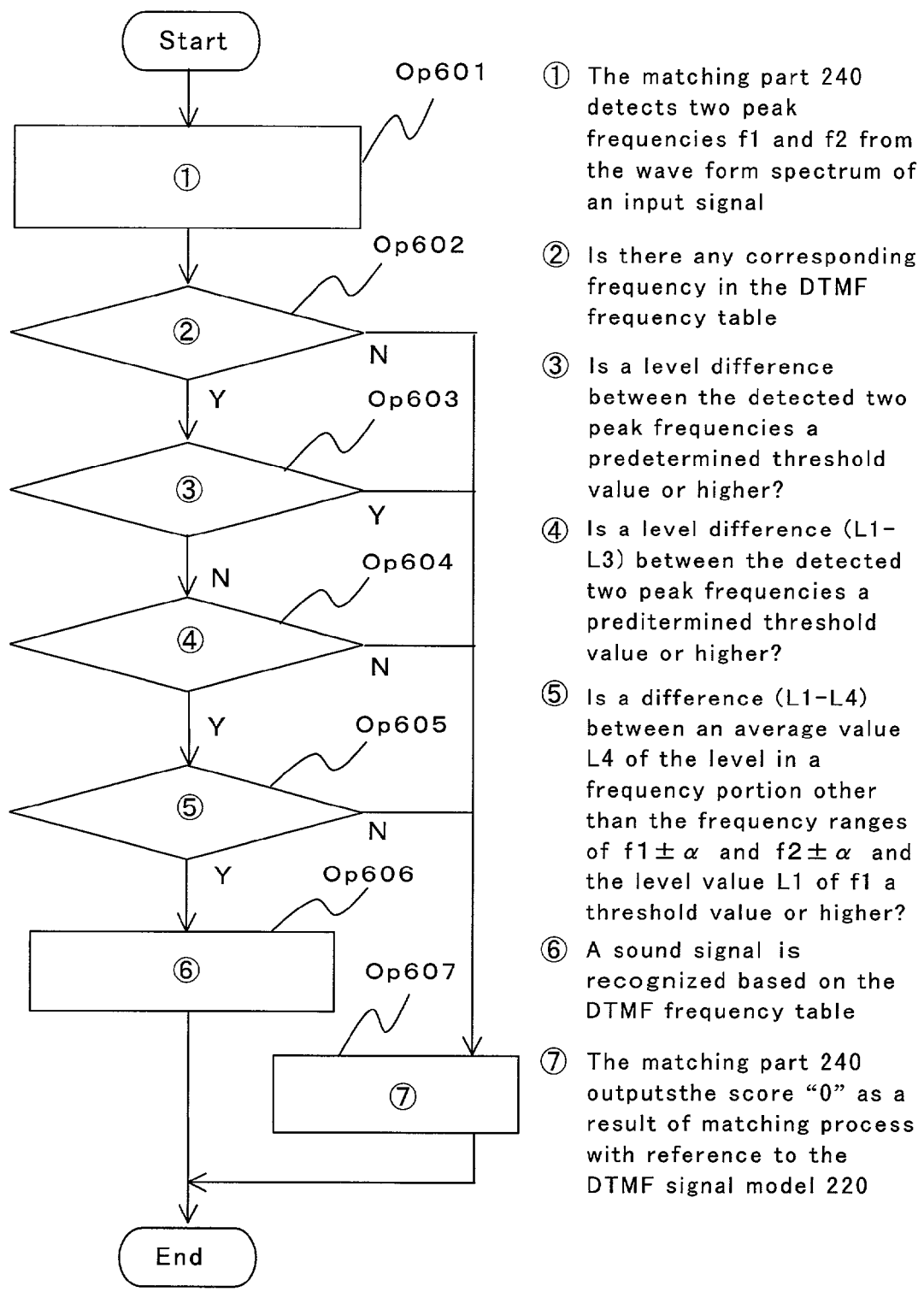
FIG. 6 is a flow chart showing the matching process with reference to a DTMF signal model.

An example of the matching process with reference to the DTMF signal model 220 is as follows in accordance with the flow chart of FIG. 6 used for the sound signal section 51.

First, the matching part 240 detects two peak frequencies from the waveform spectrum of an input signal of FIG. 5C (Operation 601). The spectrum signal waveform of the sound signal in the sound signal section 52 is as shown in FIG. 5C, and the one with the highest level (for example, a level L1' with a frequency f1' (not shown in FIG. 5C)) and the one with the second highest level (for example, a level L2' with a frequency f2' (not shown in FIG. 5C)) are detected.

Herein, a signal waveform spectrum of the sound signal section 52 is a complicated spectrum across a wide frequency range as shown in FIG. 5C, so that the possibility of its score being "0" is extremely high. In other words, the possibility of being presumed as not a DTMF signal is extremely high in executing matching with the frequency components in the DTMF frequency table shown in FIG. 17 in Operation 602, checking the level difference between the peak frequencies of f1' and f2' in Operation 603, checking the difference (L1'−L3') between the level value (referred to as L3') at the third highest peak and the level value L1' of f1' in Operation 604, and checking the difference (L1'−L4') between the average value (referred to as L4') of the level in the frequency portion other than the frequency range of f1'±α and f2'±α in Operation 605 and the level value L1' of f1'. Therefore, in this case, due to the process in Operation 607, its score is lowered and taken as "0".

(b) Matching Process with Reference to the Voice Signal Model 230

On the other hand, an example of a matching process with respect to the sound signal section 52 with reference to the voice signal model 230 is as follows.

With respect to the voice signal with the frequency spectrum as in FIG. 5C, when a matching process with reference to the voice signal model 230 is executed, a candidate of voice that can be matched is found when the performance of the voice signal model 230 is sufficient. Herein, the sound signal section 52 is recognized as a continuation of three voice signals "WA", "SHI" and "O", and its score value is, for example, taken as an appropriate numerical value that can be determined apparently to be larger than "0" as likelihood of output probability of this phoneme in the speech recognition according to the HMM using a normal distribution.

As described above, the matching part 240 selects the result of matching process with reference to the voice signal model 230 having a larger score value from the above-mentioned two processes, and the sound signal section 52 can be recognized as showing "WASHIO". Herein, it is clear that the matching part 240 was able to recognize the sound signal correctly without distinguishing whether the sound signal section 52 is a DTMF signal or a voice signal.

As described above, it is clear that the matching part 240 can continuously execute the recognition process with respect to (1) the sound signal section 51 and (2) the sound signal section 52 mentioned above without switching the mode or the like of the device at all.

On the other hand, according to the conventional matching process, when the model to be referred to in the recognition process with respect to (1) the sound signal section 51 and (2) the sound signal section 52 mentioned above is not switched, a matching process cannot be executed correctly. In other word, when a matching process with reference only to the DTMF signal 220 is executed, even if the sound signal section 51 can be recognized correctly as "1", the sound signal section 52 cannot be recognized correctly as "WASHIO". In other words, in the case where a user inputs the DTMF signal section 51 and the voice signal section 52 of "1, WASHIO" in the mixed state, the input cannot be recognized correctly. Similarly, when a matching process with reference only to the voice signal model 230 is executed, the sound signal section 51 cannot be recognized correctly as "1", and only the sound signal section 52 can be recognized correctly as "WASHIO".

As described above, according to the sound signal recognition system of Embodiment 1, when reference is made to the DTMF signal model and the voice signal model in one matching process, both the DTMF signal recognition process and the voice signal recognition process can be handled uniformly in one sound signal recognition process, and this sound signal recognition system can execute a correct sound signal recognition process in any of the case where the input sound signal includes only a sound signal by a DTMF signal, the case where the input sound signal includes only a sound signal by a voice, and the case where the input sound signal is a sound signal in which both a DTMF signal section and a voice signal section are mixed.

Embodiment 2

A sound signal recognition system and a sound signal recognition method of Embodiment 2 according to the present invention are implemented by concurrently executing the DTMF signal matching process with reference to the DTMF signal model and the voice signal matching process with reference to the voice signal model, integrating both results so as to handle them uniformly as one sound signal recognition process, whereby a sound signal recognition process can be conducted correctly in any of the case where the input sound signal includes only a sound signal by a DTMF signal, the case where the input sound signal includes only a sound signal by a voice, and the case where the input sound signal is a sound signal in which both a DTMF signal section and a voice signal section are mixed.

The sound signal recognition system of Embodiment 2 according to the present invention has a configuration including a sound signal input part and a sound signal matching/recognizing part as in FIG. 1 described in Embodiment 1; however, a sound signal matching/recognizing part 200*a* has a configuration different from that of the sound signal matching/recognizing part 200 described in Embodiment 1.

Figure 7:
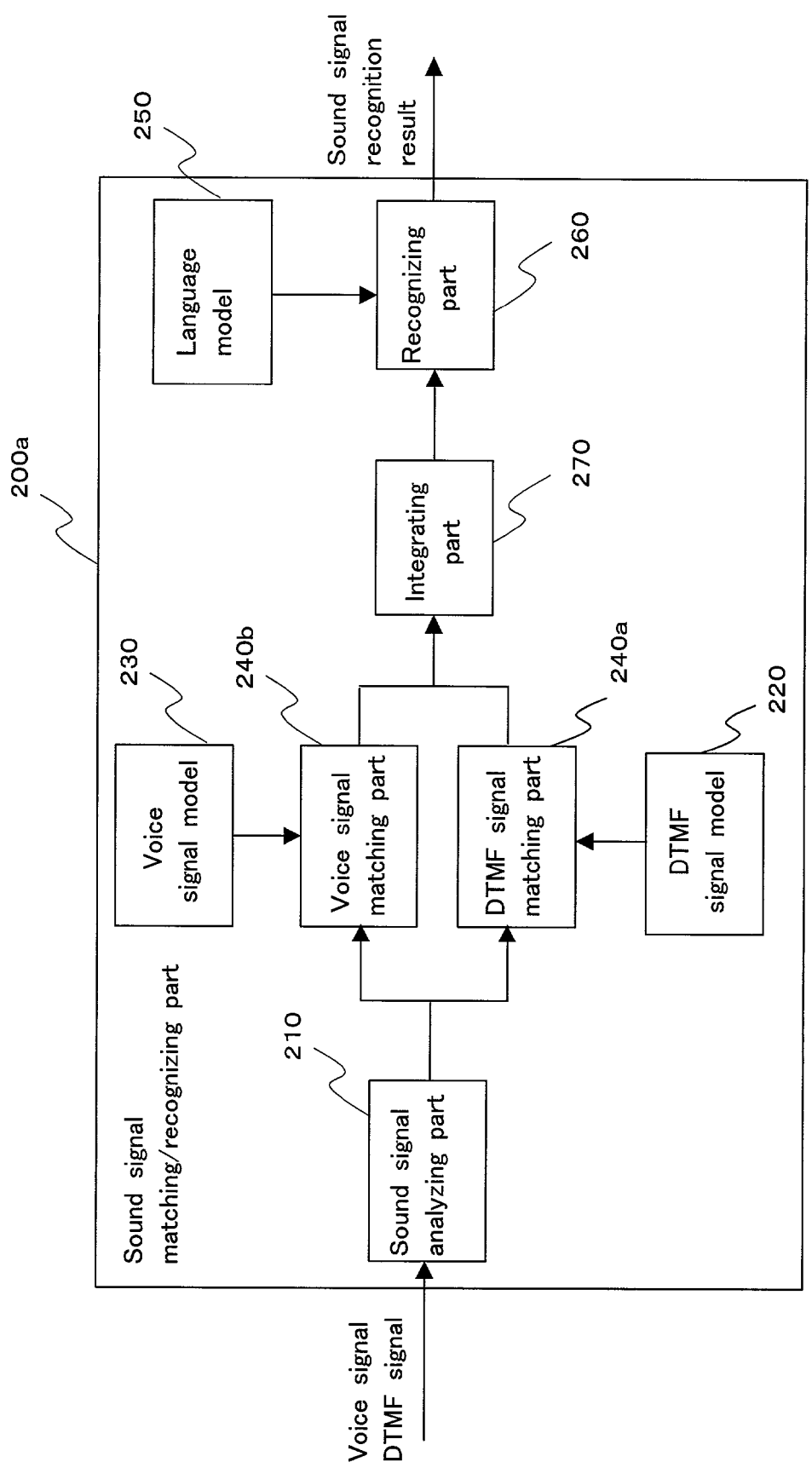
FIG. 7 is a diagram showing the internal configuration of a sound signal matching/recognizing part of Embodiment 2.

FIG. 7 shows the internal configuration of the sound signal matching/recognizing part 200*a* in Embodiment 2.

In the configuration of FIG. 7, the sound signal matching/recognizing part 200*a* includes a sound signal analyzing part 210, a DTMF signal model 220, a voice signal model 230, a DTMF signal matching part 240*a*, a voice signal matching part 240*b*, an integrating part 270, a language model 250, and a recognizing part 260.

The respective elements of the sound signal analyzing part 210, the DTMF signal model 220, the voice signal model 230, the language model 250 and the recognizing part 260 are the same as those in Embodiment 1, so that the description thereof will be omitted here.

The matching part of Embodiment 2 conducts matching using both the DTMF signal matching part 240*a* that performs matching with reference to the DTMF signal model 220 and the voice signal matching part 240*b* that performs matching with reference to the voice signal model 230.

The DTMF signal matching part 240*a* conducts matching of a sound signal for each section passed from the sound signal analyzing part 210 by using the DTMF signal model 220. The matching process is executed by calculating scores based on the matching of a sound signal in each section with a phoneme, syllable, DTMF sound inside the model and obtaining the matching result. The scores can be determined freely; however, for example, in the case of a matching process using the DTMF signal model 220, due to its high recognition accuracy, the score is given as a crisp value of "1" or "0".

Figure 8:
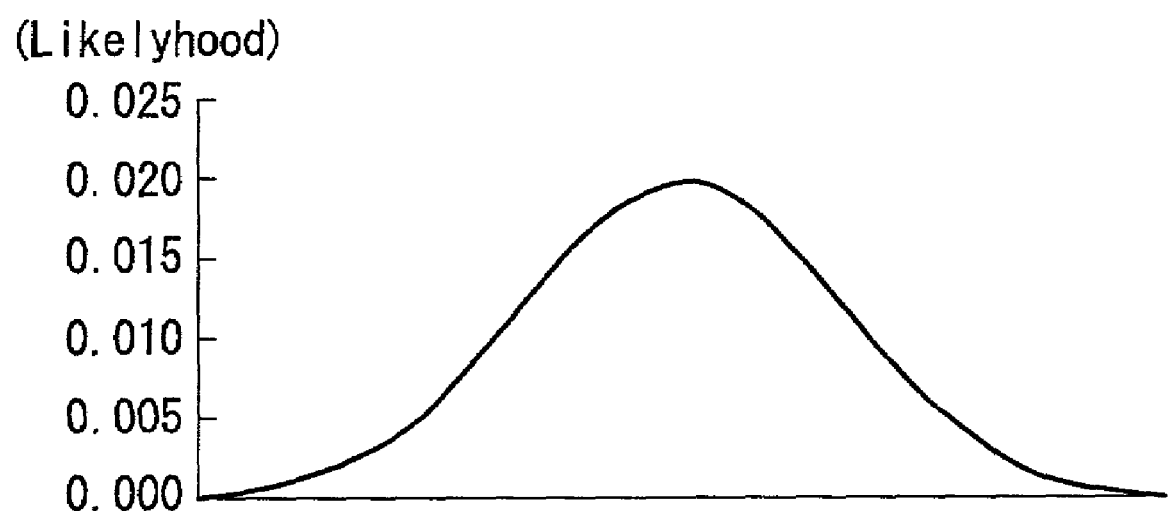
FIG. 8 is a graph showing output likelihood in the case where the variance according to a normal distribution is great.

The voice signal matching part 240*b* conducts matching of a sound signal for each section passed from the sound signal analyzing part 210 by using the voice signal model 230. The matching process is executed by calculating scores based on the matching of a sound signal in each section with a phoneme and syllable inside the model and obtaining the matching result. The scores can be determined freely; however, since speech phonation has a greater variation than in the case of a DTMF signal, for example, a speech recognition process according to HMM applying a normal distribution is used, and the voice signal matching part 240*b* outputs likelihood of output probability of a certain state in a certain phoneme. Due to the normal distribution, in the case where the variance is great as shown in FIG. 8, even if the output probability is at its maximum, the numerical value becomes considerably smaller than 1. Therefore, in order to secure a dynamic range, it is set as logarithmic likelihood. Furthermore, when the logarithmic likelihood is processed with an integral multiple method to obtain an integer, the speed of the following calculation process can be accelerated.

The integrating part 270 integrates the matching result by the DTMF signal matching part 240*a* and the matching result by the voice signal matching part 240*b*. The reason for providing the integrating part 270 is as follows.

Figure 9:
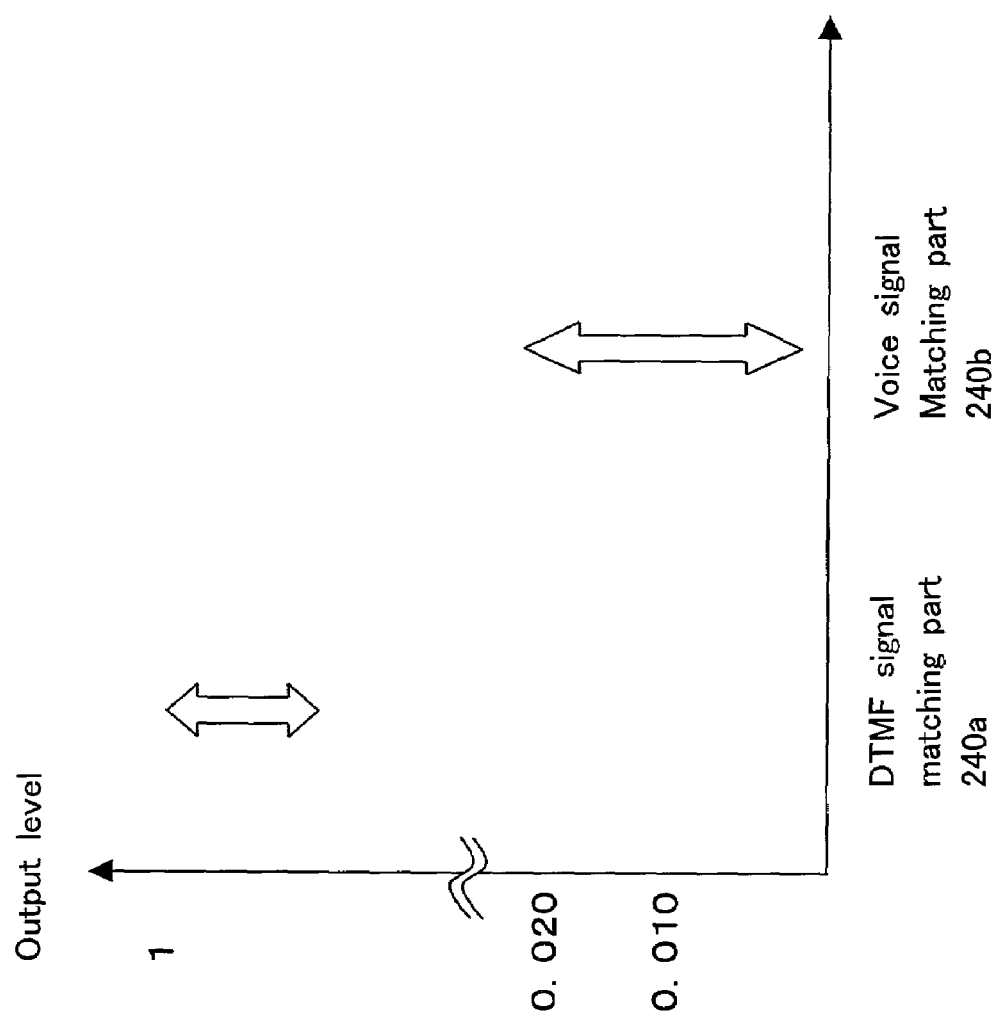
FIG. 9 is a diagram illustrating the state in which a range of matching results by a DTMF signal matching part differs from a range of matching results by a voice signal matching part.

It is conceivable that the numerical range of the matching result by the DTMF signal matching part 240*a* and the numerical range of the processing result by the voice signal matching part 240*b* will be completely different as shown in FIG. 9. In this case, when a method of selecting a better result by simply comparing the matching result by the DTMF signal matching part 240*a* with the matching result by the voice signal matching part 240*b* is used, the following inappropriate processing could happen. For example, when the matching result by the voice signal matching part 240*b* obtains a good score value as having high matching probability while the matching result by the DTMF signal matching part 240*a* obtains a bad score value as having low matching probability, the numerical ranges between the both are different, so that the latter result may be selected as having higher matching probability than the former result, thereby causing misidentification. In order to avoid the above problem, the range difference between the both is adjusted by the integrating part 270. After adjusting the ranges by the integrating part 270, comparing both matching results, and selecting a higher score value, a correct recognition result can be obtained appropriately.

In addition, based on the output of the integrating part 270, the process of executing a correct sound signal recognition process using the word dictionary of the language model 250 based on the score which the recognizing part 260 obtains from the matching part 240 is the same as that in Embodiment 1.

As described above, according to the sound signal recognition system of Embodiment 2, the DTMF signal matching with reference to the DTMF signal model and the voice signal matching process with reference to the voice signal model are executed concurrently, and both results are integrated so as to handle them uniformly as one sound signal recognition process, whereby a sound signal recognition process can be conducted correctly in any of the case where the input sound signal includes only a sound signal by a DTMF signal, the case where the input sound signal includes only a sound signal by a voice, and the case where the input sound signal is a sound signal in which both a DTMF signal section and a voice signal section are mixed.

Embodiment 3

A sound signal recognition system and a sound signal recognition method of Embodiment 3 according to the present invention has a configuration to which a system of instructing, from outside, the matching part included in the configuration of Embodiment 1 to select the model to be referred to is added.

The sound signal recognition system of Embodiment 3 according to the present invention has a configuration including a sound signal input part and a sound signal matching/recognizing part as in FIG. 1 described in Embodiment 1; however, a sound signal matching/recognizing part 200b has a configuration different from that of the sound signal matching/recognizing part 200 described in Embodiment 1.

Figure 10:
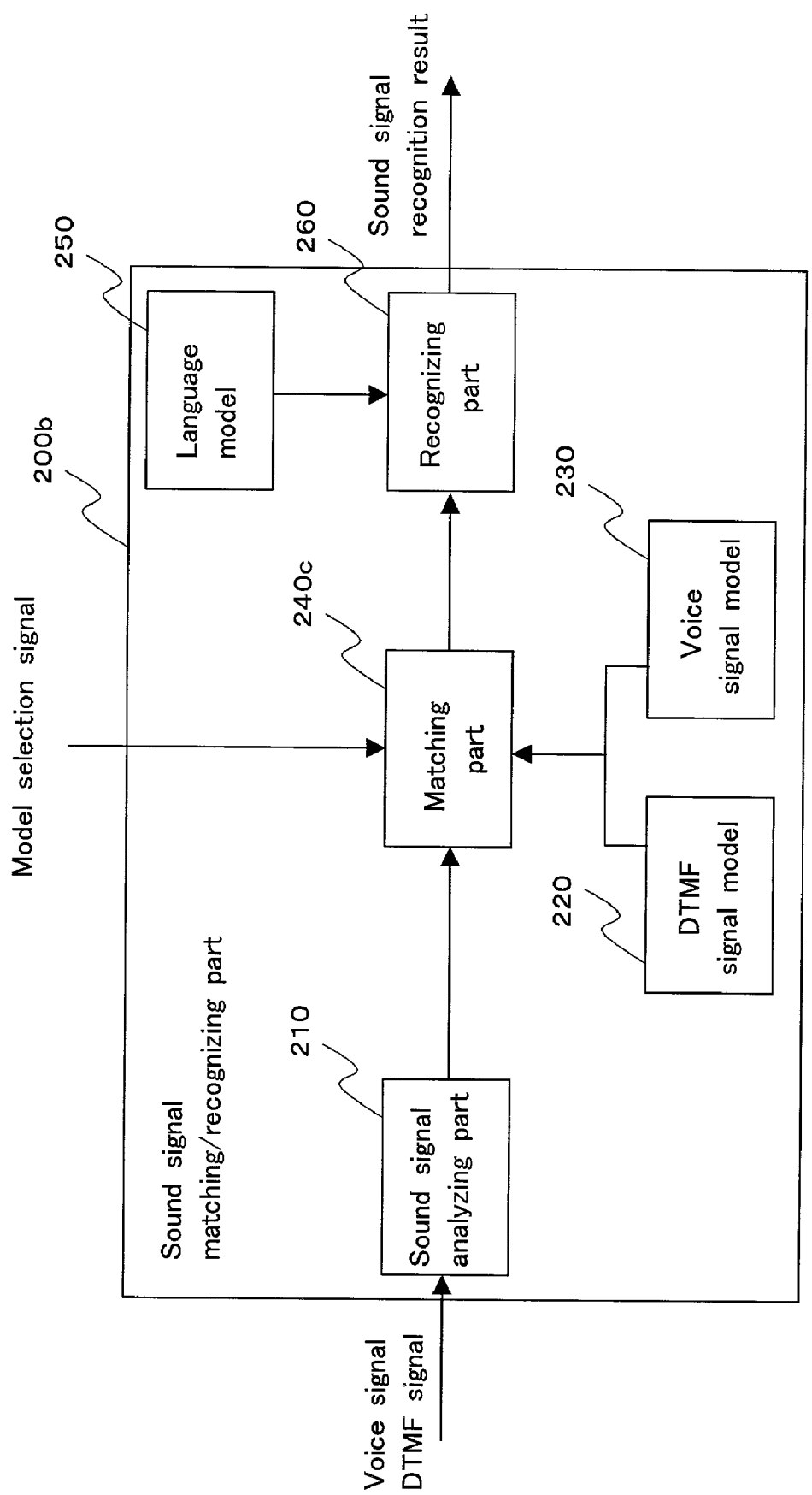
FIG. 10 is a diagram showing the internal configuration of a sound signal matching/recognizing part of Embodiment 3.

FIG. 10 shows the internal configuration of the sound signal matching/recognizing part 200b in Embodiment 3. In the configuration of FIG. 10, the sound signal matching/recognizing part 200b includes a sound signal analyzing part 210, a DTMF signal model 220, a voice signal model 230, a matching part 240c, a language model 250, and a recognizing part 260. The matching part 240c includes an input portion for accepting input of a model selection signal from outside.

The matching part 240c accepts input of a model selection signal and selects a model used in the matching process. In this example, it is possible to select either the DTMF signal model 220 or the voice signal model 230, or both thereof.

For example, when misidentification occurs frequently with respect to input by voice signals due to the effects of the sound signal input environment or the communication environment, it may be preferable to stop the input by a voice and to switch to input only by DTMF signals. For example, in cases where a user feels that the input voice is not recognized correctly frequently or the application side determines that the content that is different from the expected response content is input frequently, the user is guided to stop the voice input and to input by DTMF signals, and at the same time, a model selection signal is given to the matching part 240c to configure a configuration in which the DTMF signal model 220 only is selected. According to this configuration, the matching part 240c of the sound signal recognition system refers only to the DTMF signal model and does not refer to the voice signal model 230.

On the contrary, when misidentification occurs frequently with respect to input by DTMF signals, it may be preferable to stop the input by DTMF signals and to switch to input only by a voice. Also in this case, the user is guided to stop the input by DTMF signals and to input by a voice, and at the same time, a model selection signal is given to the matching part 240c to configure a configuration in which the voice signal model 230 only is selected.

As described above, the sound signal recognition system of Embodiment 3 has a configuration to which a system of instructing, from outside, the matching part included in the configuration of Embodiment 1 to select the model to be referred to is added. Therefore, the effects of the sound signal input environment or the communication environment can be taken into consideration, and only either one selected from the DTMF signal model 220 and the voice signal model 230 or both models can be selected.

Embodiment 4

Embodiment 4 according to the present invention is a dialog control system adopting the respective sound signal recognition systems shown in Embodiments 1 to 3. In particular, a dialog control system win be described, which is used for an application of accepting an order of a product from a user by an automatic telephone response system.

Figure 11:
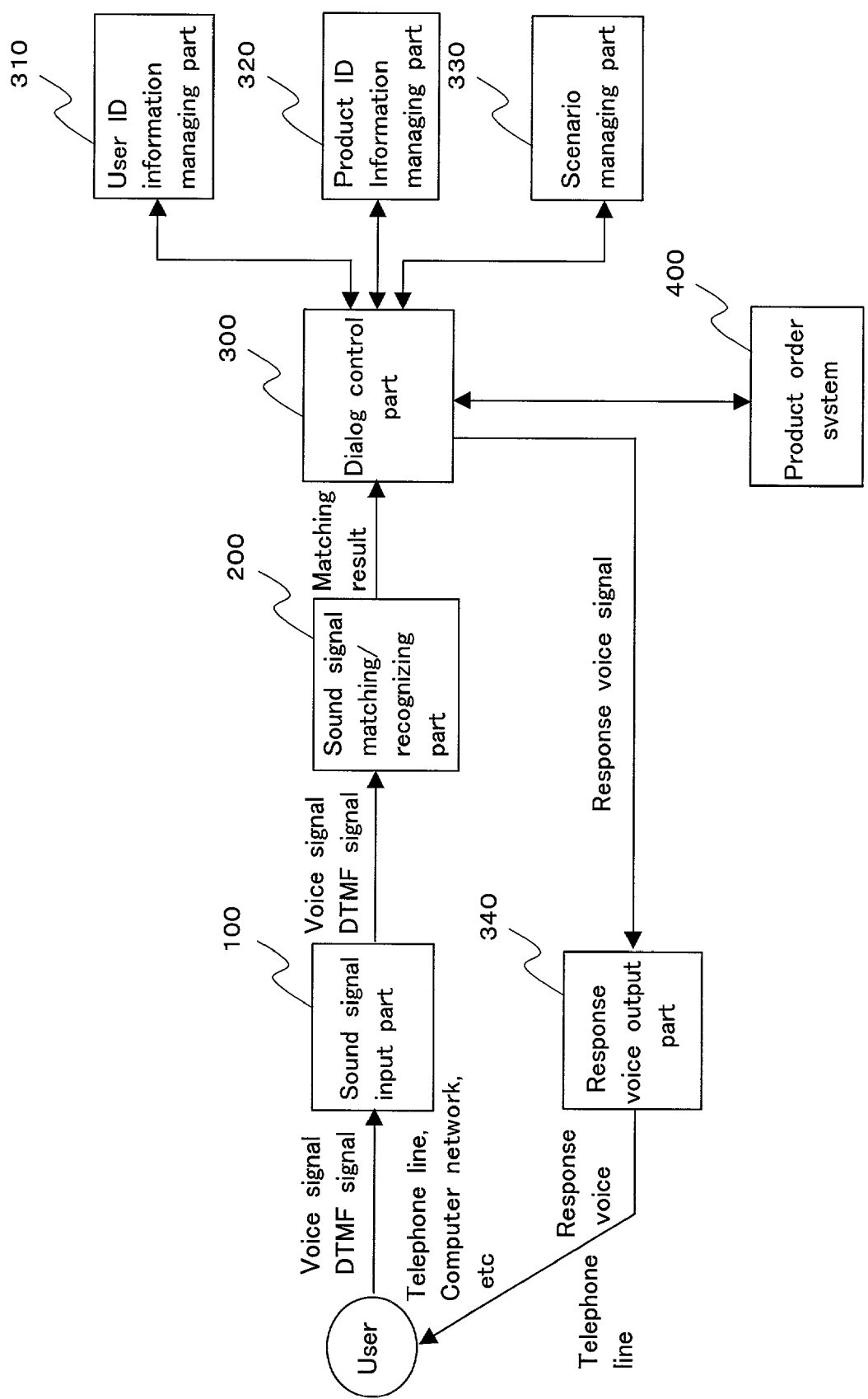
FIG. 11 is a diagram showing an exemplary configuration of a dialog control system adopting a sound signal recognition system of Embodiment 4 according to the present invention.

FIG. 11 is a diagram showing an exemplary configuration of a dialog control system applying a sound signal recognition system of Embodiment 4 according to the present invention.

In FIG. 11, the sound signal input part 100 and the sound signal matching/recognizing part 200 are the same as those shown in Embodiments 1 to 3. The sound signal matching/recognizing part 200 may be the sound signal matching/recognizing part 200a described in Embodiment 2 or the sound signal matching/recognizing part 200b described in Embodiment 3.

In this example, the word dictionary used by the language model 250 in the sound signal matching/recognizing part 200 is the type shown in FIG. 4.

The dialog control system of Embodiment 4 according to the present invention further includes a dialog managing part 300, a user ID information managing part 310, a product ID information managing part 320, a scenario managing part 330, and a response voice output part 340. In addition, in this example, the application system is a product order system 400.

The user ID information managing part 310 manages correspondence information on user IDs and names.

The product ID information managing part 320 manages correspondence information of product IDs and product names.

The scenario managing part 330 manages the scenario showing how a dialog is to be proceeded. Also included in the scenario are input information from a user that is conceivable at each stage of the dialog and output information responding to this input information, item information for asking a user to input at each stage of the dialog and output information to be questions asking for the input of the item information and so on.

The response voice output part 340 returns the content in accordance with the specification of the dialog managing part to the user.

The dialog control part 300 controls a response to a user and a dialog flow with the user. The dialog managing part 300 proceeds with a dialog with the user according to the scenario included in the scenario managing part 330, and upon receiving an order from the user, transmits the content of the order to the product order system 400.

In this example, a dialog with the user is executed by sound signals. The dialog from the dialog control system to the user is performed such that a command signal showing the content of the dialog is sent to the response voice output part 340 and that the response voice output part 340 converts it to a sound signal and outputs it as speech from a loudspeaker provided in the user system. Thus, information related to the product, guidance related to sound signal input of information on the user ID, the product order, or the like is provided to the user by speech.

On the other hand, a dialog from the user to the dialog control system is performed by input of a user's voice or input of DTMF signals to a touchtone telephone.

FIG. 12 is a diagram showing an example of a dialog flow that takes place between a user and the dialog control system of Embodiment 4. As shown in FIG. 12, the user can perform input including only a DTMF signal section (for example, input of U1 in FIG. 12), input including only a voice signal section (for example, input of U2 in FIG. 12), and input in which a voice signal section and a DTMF signal section are mixed (for example, input of U3 in FIG. 12). The dialog control system can recognize any sound signal input among these three kinds correctly based on the function of the sound signal recognition system of the present invention.

Figure 13:
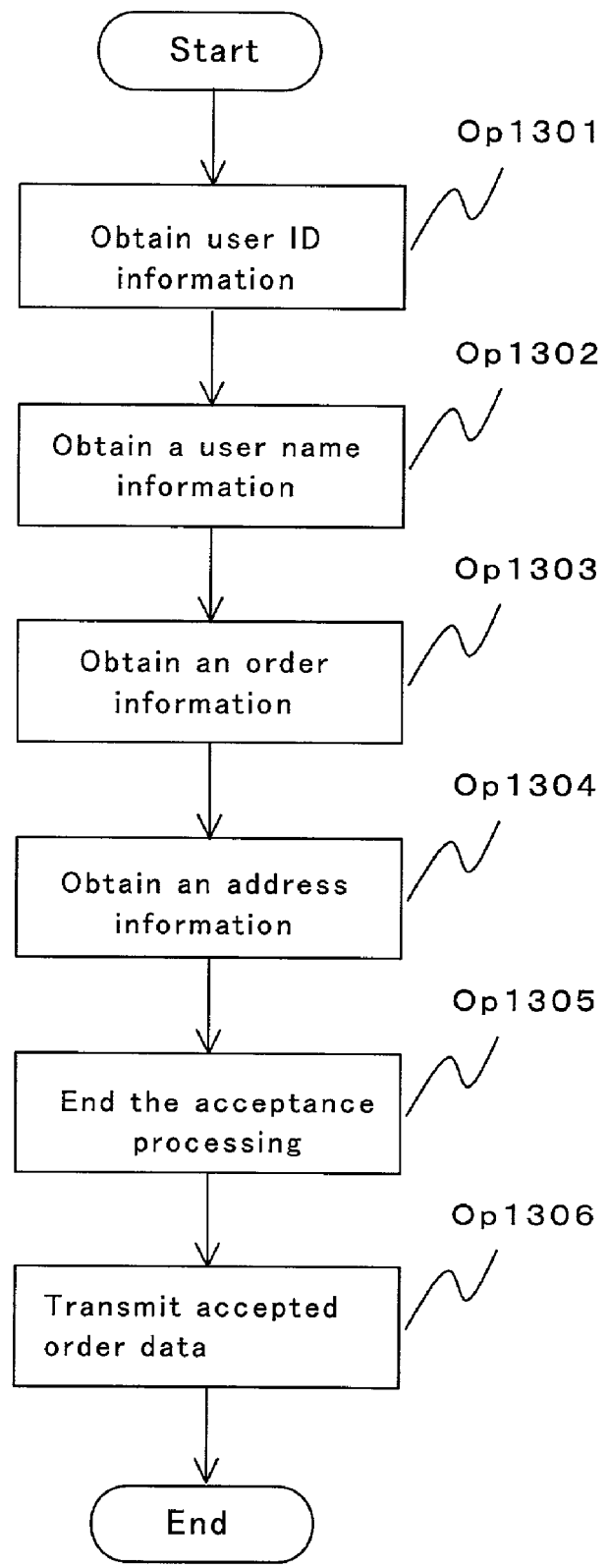
FIG. 13 is a flow chart showing an example of a dialog flow that takes place between a user and the dialog control system of Embodiment 4 in an application concerning an order of a product.
Figure 14:
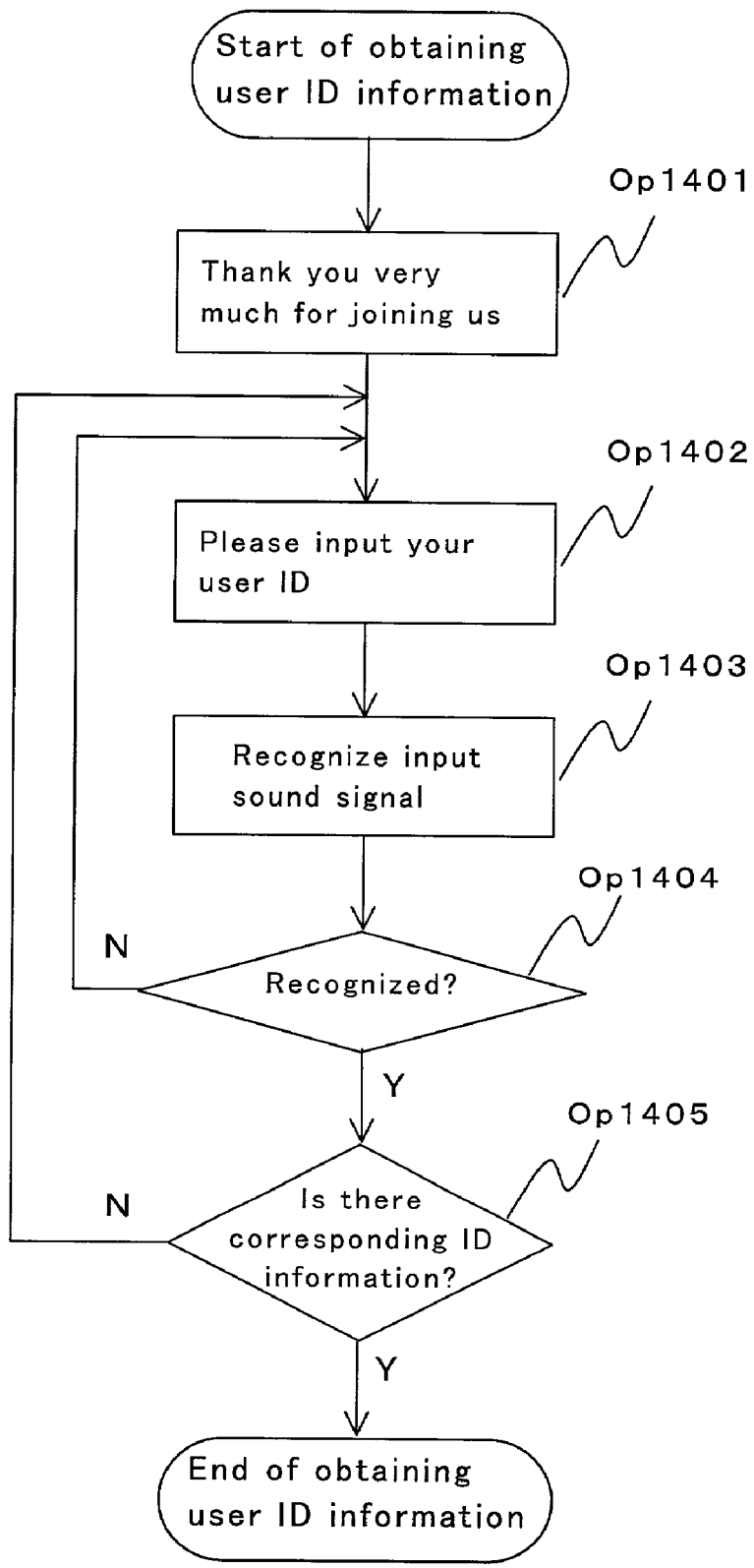
FIG. 14 is a flow chart showing in detail an operation of obtaining user ID information in the flow chart of FIG. 13.

FIG. 13 is a flow chart showing an example of a dialog flow that takes place between a user and the dialog control system of Embodiment 4 in an application concerning an order of a product. FIG. 14 is a flow chart showing, in detail, Operation 1301 of obtaining user ID information in the flow chart of FIG. 13.

As shown in the example of FIG. 14, input is repeated until the input user ID information falls under the ID information managed by the user ID information managing part 310. This input can be recognized as a voice signal or a DTMF signal, and this result of recognition is returned to the dialog managing part 300 by the word ID, so that the following advantages can be obtained.

First, both a voice signal and a DTMF signal can be recognized, so that it is no longer necessary to conduct the operation of branch selection process for selecting whether to be on standby for input by a voice or to be on standby for input process by a DTMF signal as in the conventional system.

Second, it is no longer necessary to conduct the operation of guidance process for limiting the input from the user either to a voice signal or to a DTMF signal and the operation of input standby process.

Third, it is not necessary to branch the recognition process by the sound signal recognition system in the dialog system depending on whether a voice signal or a DTMF signal is selected as input from the user.

FIG. 14 shows, in detail, Operation 1301 of obtaining user ID information in the flow chart of FIG. 13; however similarly, also with respect to the process of obtaining name information (Operation 1302), the process of obtaining order information (Operation 1303), and the process of obtaining address information (Operation 1304), the flow charts can be formed as the flow chart of FIG. 14, and the above-mentioned results can be obtained.

Embodiment 5

A dialog system applying a sound signal recognition system of Embodiment 5 according to the present invention is a dialog system for inviting a user to input a DTMF signal instead of input by a voice, depending upon the situation, such as the cases where the SN ratio in the speech input environment, the communication environment etc. does not reach a predetermined level, the likelihood of voice input of the user obtained in the course of a dialog is generally low, or the like. In the present embodiment, the example will also be described in which the dialog control system is applied to an application accepting an order of a product from a user by an automatic telephone response system.

Figure 15:
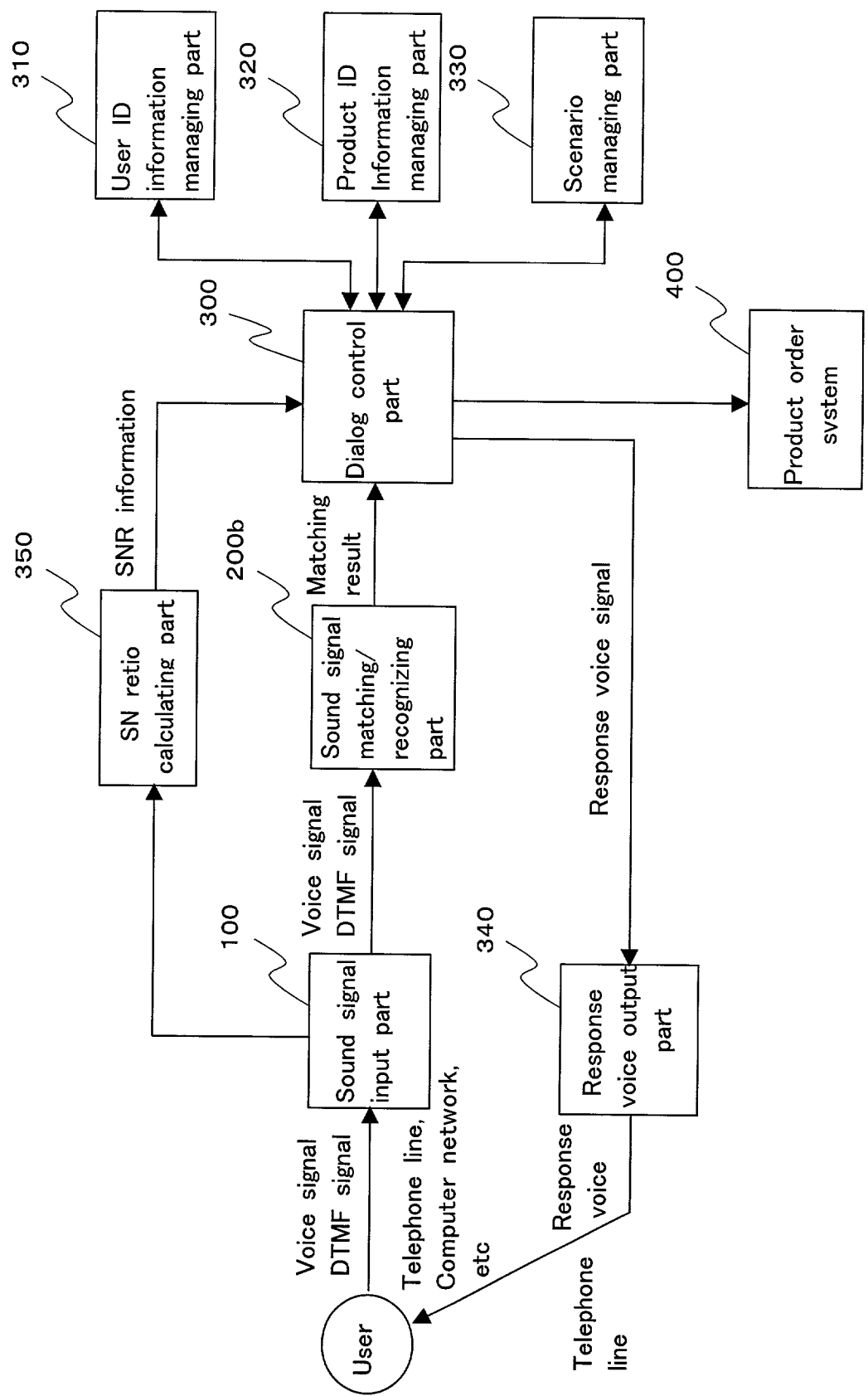
FIG. 15 is a diagram showing an exemplary configuration of a dialog control system that guides a user to DTMF signal input in the case where a signal-noise (SN) ratio does not reach a predetermined level in Embodiment 5.

FIG. 15 shows an exemplary configuration of a system that guides a user to DTMF signal input in the case where a SN ratio does not reach a predetermined level.

In FIG. 15, the sound signal input part 100 and the sound signal matching/recognizing part 200b are the same as those shown in Embodiment 3. In addition, in this example, the word dictionary used by the language model 250 in the sound signal matching/recognizing part 200b is the type shown in FIG. 4. Furthermore, a dialog managing part 300, a user ID information managing part 310, a product ID information managing part 320, a scenario managing part 330, a response voice output part 340, and a product order system 400 are the same as those described in Embodiment 4.

The dialog control system of Embodiment 5 further includes a SN ratio calculating part 350. The SN ratio calculating part 350 receives a sound signal inputted from the sound signal input part 100, calculates a SN ratio thereof, and outputs it to the dialog managing part 300. In addition, it is also possible to include the SN ratio calculating part 350 inside the sound signal matching/recognizing part 200b.

The dialog managing part 300 determines the SN ratio to be bad when the value of the SN ratio received from the SN ratio calculating part 350 is of a certain threshold value or higher. Under the conditions that the SN ratio is determined to be bad and that it reaches a phase of inviting the user to some kind of input, the dialog managing part 300 guides the user to DTMF signal input. For example, as a message for inviting DTMF signal input, it is output as "Since the noise is rather loud, touch tone-button input is recommended than speech input." through the response voice output part 340.

Furthermore, also in the case where the likelihood of voice input by the user obtained in the course of a dialog is generally low, the guidance can be preformed in the like manner.

As described above, according to the dialog control system of Embodiment 5, it is possible to invite the user to input by DTMF signals depending upon the situation, such as cases where the SN ratio of the voice signal input from the user does not reach a predetermined level or the likelihood of voice input by the user obtained in the course of the dialog is generally low. As a result, misidentification can be reduced, and the dialog flow can be smoothened.

Embodiment 6

Figure 16:
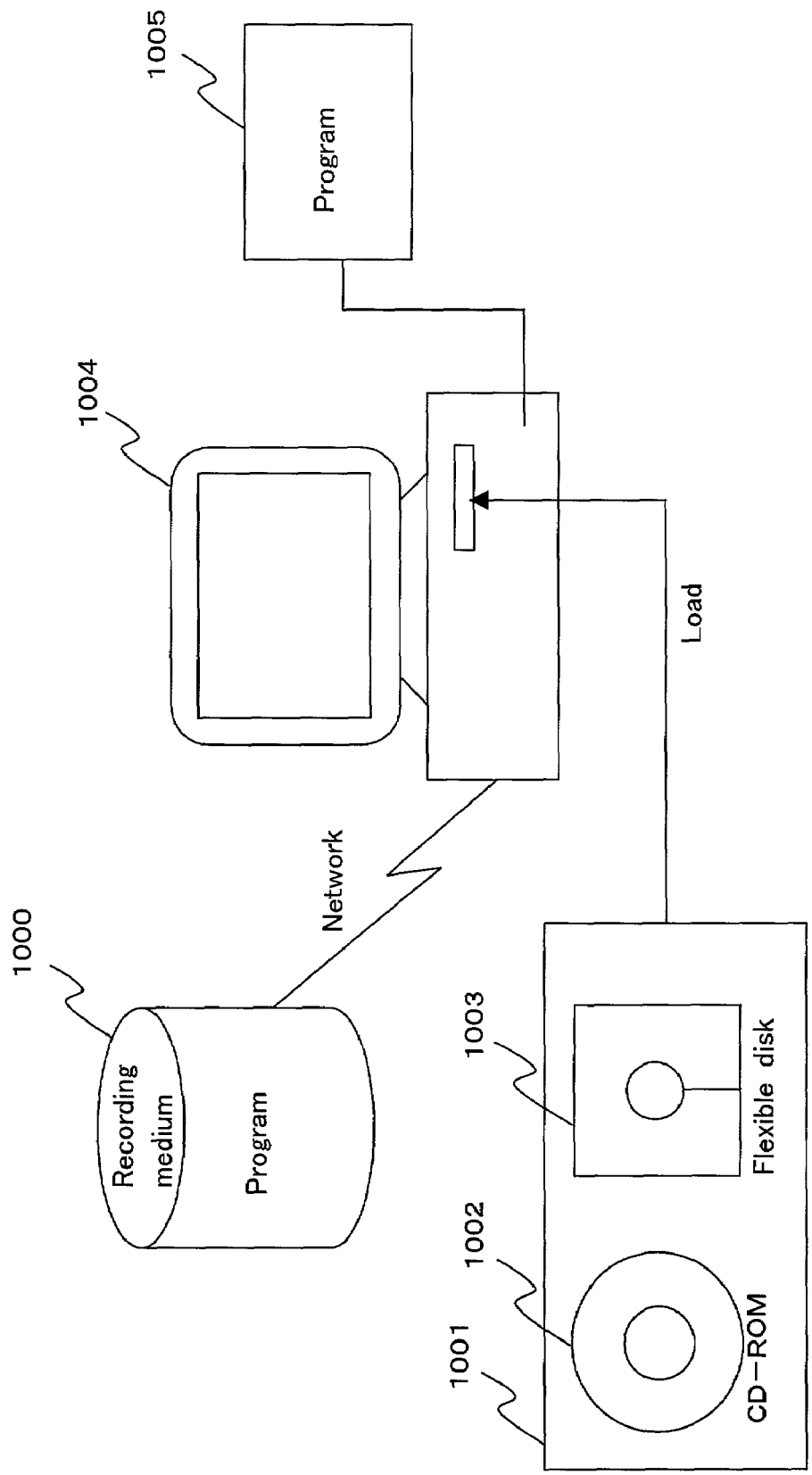
FIG. 16 shows examples of a recording medium storing a processing program for implementing the sound signal recognition system of Embodiment 4 according to the present invention.
Figure 18:
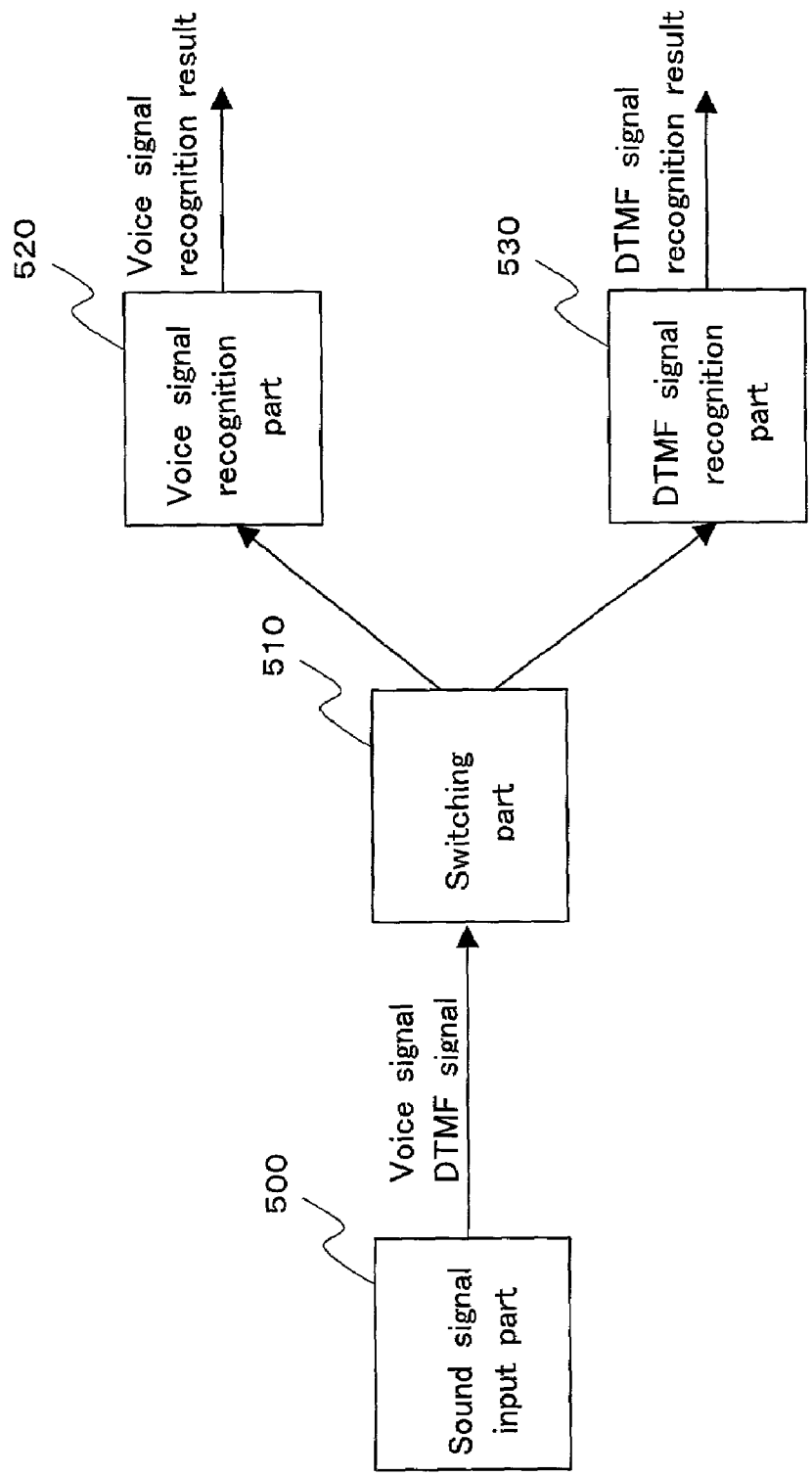
FIG. 18 is a simplified diagram showing a conventional exemplary configuration of a telephone audio response system in which input by a DTMF signal can be used together with input by a user's voice signal.

The sound signal recognition system and the sound signal recognition method of the present invention, and the dialog control system and the dialog control method applying the sound signal recognition system of the invention can be described as a program in which processing operations of achieving the above-mentioned configuration are described, and the sound signal recognition process of the present invention can be executed by allowing a computer to read this program. The program including the processing operations of achieving the sound signal recognition system of the present invention can be provided as in the examples shown in FIG. 16. More specifically, the program can be provided by being stored not only in a portable recording medium 1001 such as a CD-ROM 1002, a flexible disc 1003, or the like but also in a recording medium 1000 inside a recording device available on a network or in a recording medium 1005 such as a hard disc of a computer and a RAM. It is also possible to download the program from the network. In execution, the program is loaded onto a computer 1004 and executed on the main memory.

The sound signal recognition system of the present invention can be applied not only to a telephone line but also to a network communication system simulating a telephone line as in an IP telephone using VoIP, and further to a remote control device having a DTMF signal dispatch function and a speech input (microphone input) function.

According to the sound signal recognition system and the dialog control system of the present invention, a sound signal including a voice signal section and a DTMF signal section in the mixed state can be input, and a user can perform input freely without distinguishing voice input from DTMF signal input.

Furthermore, according to the sound signal recognition system and the dialog control system of the present invention, improvement in the usability of a user such as reduction in a dialog process time and improvement in the recognition ratio are to be expected. In addition, it is also expected to achieve the effects of simplifying the dialog control, reducing the number of design processes related to the dialog process, and reducing cost reduction therewith.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A sound signal recognition system, comprising:
    a sound signal input part receiving a sound signal including one of either a voice signal or a DTMF signal, or both;
    a sound signal analyzing part calculating a feature value by conducting an acoustic process for each segment of a sound signal;
    a matching part including a voice signal model and a DTMF signal model, matching the feature value, calculated by the sound signal analyzing part, with both the voice signal model and the DTMF signal model, and producing a matching result;
    a sound signal recognizing part, including a language model, recognizing the sound signal by using the matching result of the matching part and the language model, and selecting a better result by comparing the matching result using the voice signal model with the matching result using the DTMF signal model in the matching part for each segment of a sound signal,
        wherein a sound signal recognition process is conducted with respect to the sound signal including either the voice signal or the DTMF signal, or both; and
    an integrating part connecting sound signal recognition results selected by the sound signal recognizing part and integrating them as a total sound signal recognition result with respect to all the sections of the input sound signal.

2. The sound signal recognition system according to claim 1, wherein the language model is capable of including a DTMF signal as sound signal recognition vocabulary.

3. The sound signal recognition system according to claim 1, further comprising:
    a guidance part providing a user, who performs sound signal input via the sound signal input part, with guidance on whether a specific vocabulary is to be input as a voice signal or a DTMF signal.

4. A dialog control system including a sound signal recognition system of claim 1, which controls a dialog flow with a user, based on a sound signal recognition result according to the sound signal recognition system.

5. The sound signal recognition system according to claim 1, further comprising:
    a guidance part providing a user, who performs sound signal input via the sound signal input part, with guidance on whether a specific vocabulary is to be input as a voice signal or a DTMF signal.

6. A dialog control system including a sound signal recognition system of claim 1, which controls a dialog flow with a user, based on a sound signal recognition result according to the sound signal recognition system.

7. The sound signal recognition system according to claim 1, wherein upon detecting that a misidentification rate of a sound signal inputted by a voice for a specific vocabulary is high under predetermined conditions, an integrating part notifies the guidance part of instruction information on outputting guidance regarding asking the user to conduct re-input of the sound signal by a DTMF signal for the specific vocabulary.

8. A dialog control system including a sound signal recognition system of claim 7, which controls a dialog flow with a user, based on a sound signal recognition result according to the sound signal recognition system.

9. The sound signal recognition system according to claim 1, wherein the integrating part estimates and holds a misidentification rate in the matching result.

10. A dialog control system including a sound signal recognition system of claim 9, which controls a dialog flow with a user, based on a sound signal recognition result according to the sound signal recognition system.

11. The sound signal recognition system according to claim 1, wherein the guidance part notifies a user of correspondence between a DTMF signal and a vocabulary in advance.

12. A dialog control system including a sound signal recognition system of claim 11, which controls a dialog flow with a user, based on a sound signal recognition result according to the sound signal recognition system.

13. A dialog control system including a sound signal recognition system of claim 1, which controls a dialog flow with a user, based on a sound signal recognition result according to the sound signal recognition system.

14. A sound signal recognition method, comprising:
    inputting a sound signal including one of either a voice signal or a DTMF signal, or both;
    calculating a feature value by conducting an acoustic process for each segment of the sound signal;
    matching the feature value with both a voice signal model and a DTMF signal model, and producing a matching result;
    recognizing the sound signal by using the matching result and a language model;
    selecting a better result by comparing the matching result using the voice signal model with the matching result using the DTMF signal model for each segment of a sound signal;
    conducting a sound signal recognition process with respect to the sound signal including one of either the voice signal or the DTMF signal, or both; and
    connecting sound signal recognition results, selected by said selecting a better result, and integrating them as a total sound signal recognition result with respect to all the sections of the input sound signal.

15. A dialog control method including the sound signal recognition method of claim 14, which controls a dialog flow with a user, based on a sound signal recognition result using the sound signal recognition method.

16. A computer-readable recording medium storing a sound signal recognition program for executing a sound signal recognition process with respect to an input sound signal including either one selected from a voice signal section and a DTMF signal section or both sections, the program controlling a computer by:

inputting a sound signal including one of either a voice signal or a DTMF signal, or both;

calculating a feature value by conducting an acoustic process for each segment of the sound signal;

matching the calculated feature value with both a voice signal model and a DTMF signal model;

selecting a better result by comparing the matching result using the voice signal model with the matching result using the DTMF signal model for each segment of a sound signal;

performing recognition of the sound signal by using a language model based on a matching result, the language model including a word dictionary and grammar; and connecting sound signal recognition results, selected by said selecting a better result, and integrating them as a total sound signal recognition result with respect to all the sections of the input sound signal.

* * * * *

UNITED STATES PATENT AND TRADEMARK OFFICE
CERTIFICATE OF CORRECTION

PATENT NO.         : 7,177,806 B2                                   Page 1 of 1
APPLICATION NO.    : 10/082146
DATED              : February 13, 2007
INVENTOR(S)        : Nobuyuki Washio It is certified that error appears in the above-identified patent and that said Letters Patent is hereby corrected as shown below:

Title Page, Column 2 (Other Publications), Line 3, change "Proceedings.," to --Proceedings,--.

Signed and Sealed this

Twenty-ninth Day of May, 2007

JON W. DUDAS
*Director of the United States Patent and Trademark Office*